United States Patent [19]

Miyata

[11] Patent Number: 5,668,615

[45] Date of Patent: Sep. 16, 1997

[54] LCD DEVICE WITH ALIGNMENT FILMS HAVING A PRETILT CHANGING CHARACTERISTIC

[75] Inventor: Hirokatsu Miyata, Hadano, Japan

[73] Assignee: Canon Kabushiki Kaisha, Tokyo, Japan

[21] Appl. No.: 379,759

[22] Filed: Jan. 27, 1995

[30] Foreign Application Priority Data

Jan. 31, 1994 [JP] Japan ................................. 6-025914

[51] Int. Cl.⁶ ........................... G02F 1/1337; G02F 1/141
[52] U.S. Cl. ............................................. 349/126; 349/133
[58] Field of Search ...................... 359/76, 78; 349/126, 349/133, 132

[56] References Cited

U.S. PATENT DOCUMENTS

| | | | |
|---|---|---|---|
| 4,367,924 | 1/1983 | Clark et al. | 359/356 |
| 5,069,533 | 12/1991 | Yuassa et al. | 359/76 |
| 5,073,294 | 12/1991 | Shannon et al. | 359/76 |
| 5,172,255 | 12/1992 | Brossig et al. | 359/78 |
| 5,353,141 | 10/1994 | Onuma et al. | 359/76 |
| 5,455,695 | 10/1995 | Kodera et al. | 359/78 |
| 5,473,455 | 12/1995 | Koike et al. | 359/78 |

FOREIGN PATENT DOCUMENTS

| | | |
|---|---|---|
| 63-30828 | 2/1988 | Japan . |
| 63-199319 | 8/1988 | Japan . |
| 01055527 | 3/1989 | Japan . |
| 3-69919 | 3/1991 | Japan . |
| 5-45654 | 2/1993 | Japan . |

OTHER PUBLICATIONS

Nakano et al., Japanese Journal of Applied Physics, v. 19 No. 10 (1980) pp. 2013–2014.

Primary Examiner—Anita Pellman Gross
Assistant Examiner—Toan Ton
Attorney, Agent, or Firm—Fitzpatrick, Cella, Harper & Scinto

[57] ABSTRACT

A liquid crystal display device is constituted by a pair of substrates each having thereon an electrode and a chiral smectic liquid crystal disposed between the substrates so as to assume at least two optically stable states. At least one of the substrates has thereon an alignment film. Undesirable liquid crystal movement in the liquid crystal device is effectively suppressed because the alignment film is provided with a uniaxial aligning treatment direction and also a pretilt-changing characteristic such that it provides a pretilt angle which monotonously changes and is then inverted through 0 degree to a state providing a reverse molecular inclination with respect to the associated substrate. Such a pretilt-changing characteristic is provided, e.g., by rubbing the substrate with a rubbing roller inclined thereto at least two times in normal and reverse directions. As a result, the liquid crystal display device becomes free from deterioration in switching characteristic or coloring due to liquid crystal movement without impairing homogeneous uniform alignment characteristic.

11 Claims, 8 Drawing Sheets

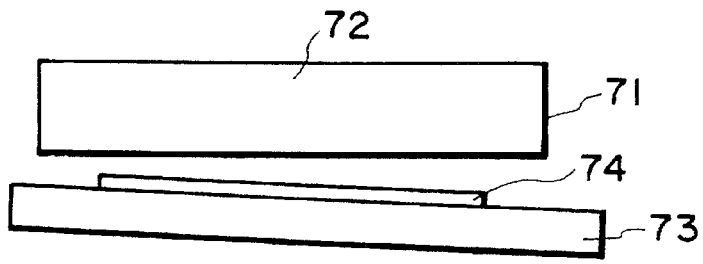
F I G. 7A
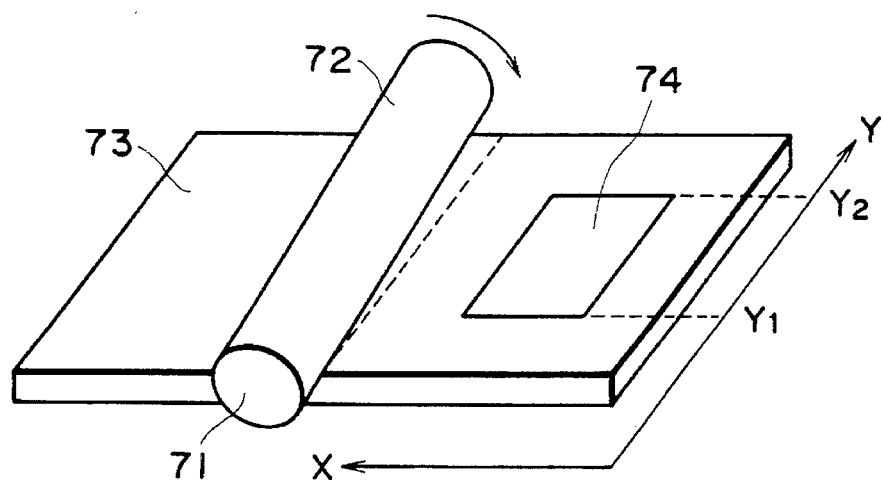
F I G. 7B
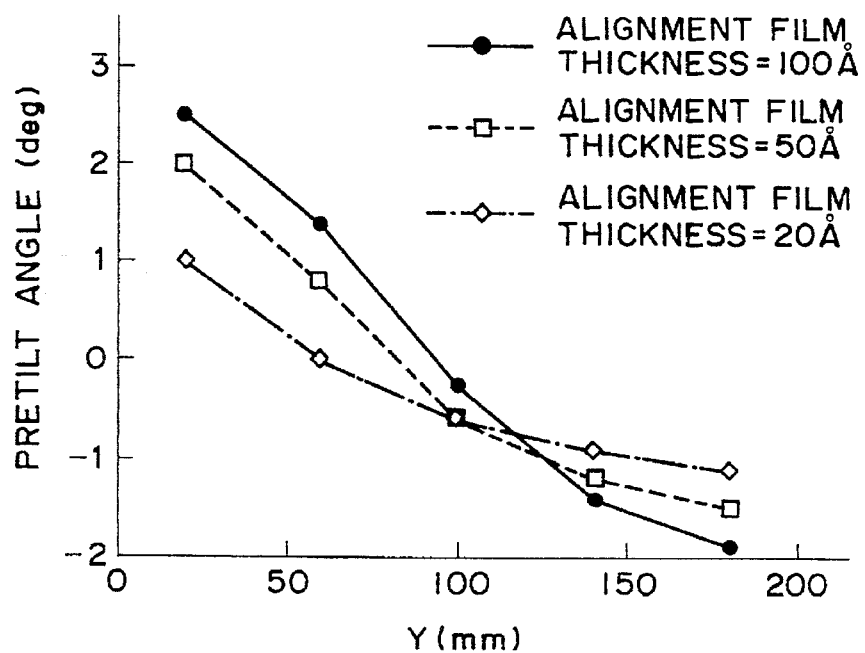
F I G. 8

LCD DEVICE WITH ALIGNMENT FILMS HAVING A PRETILT CHANGING CHARACTERISTIC

FIELD OF THE INVENTION AND RELATED ART

The present invention relates to a liquid crystal display device containing a chiral smectic liquid crystal used for a terminal display for a computer, a word processor and a typewriter, a television receiver, a view finder for a video camera, a lightvalve for a projector, a light valve for a liquid crystal printer, etc. More particularly, the present invention relates to a liquid crystal display device capable of preventing a change in liquid crystal cell thickness due to liquid crystal molecular movement and a process for production thereof.

There has been proposed a liquid crystal display device of the type which controls transmission by utilizing the refractive index anisotropy of a ferroelectric liquid crystal as a chiral smectic liquid crystal in combination with a polarizer by Clark and Lagerwall (U.S. Pat. No. 4,367,924, etc.). The ferroelectric liquid crystal generally has chiral smectic C phase (SmC*) or H phase (SmH*) in a specific temperature region and, under this state, shows a property of assuming either one of a first optically stable state on a second optically stable state in response to an electric field applied thereto and maintaining such a state in the absence of an electric field, namely bistability, and also has a rapid responsiveness to a change in electrical field. Thus, it is expected to be utilized as a high-speed and memory-type display device.

FIG. 11A is a schematic plan view of such a liquid crystal display device and FIG. 11B is an illustration of a liquid crystal molecular movement caused in such a liquid crystal display device.

When such a device is continually driven for a long period, a side or edge region 113 of the display area is colored or tinged in yellow. Such a phenomenon not only deteriorates the appearance of the picture but also can change the switching characteristics of the related liquid crystal pixels. This phenomenon is particularly noticeable in a cell having a uniform alignment state providing a high contrast.

It has been found that such a phenomenon has caused by movement of liquid crystal molecules toward the region 113 to increase the liquid crystal layer thickness (which may be also called a spacing between the substrates or a cell thickness) at the region 113.

Our research and development group has proposed to provide an unevenness on the substrate surfaces for hindering the liquid crystal movement, but this has required difficult unevenness designing and production steps, thus providing an obstacle for realizing lower production costs.

SUMMARY OF THE INVENTION

In view of the above problems, a principal object of the present invention is to provide a liquid crystal display device capable of preventing liquid crystal movement without requiring complicated production steps or design change, and also a process for producing the liquid crystal display device.

According to the present invention, there is provided a liquid crystal display device, comprising: a pair of substrates each having thereon an electrode and a chiral smectic liquid crystal disposed between the substrates so that said liquid crystal assumes at least two optically stable states; at least one of the substrates having thereon an alignment film, said alignment film having a uniaxial aligning treatment direction and also a pretilt-changing characteristic such that it provides a pretilt angle which changes monotonously, preferably substantially linearly, and is then inverted through 0 degree to a state providing a reverse molecular inclination With respect to the associated substrate. Herein, the pretilt angle means an average pretilt angle.

In a preferred embodiment of the liquid crystal display device according to the present invention, the liquid crystal provides an apparent tilt angle $\theta a$ defined as a half of an angle between said two optically stable states satisfying a relationship of $(H)/2 < \theta a \leq (H)$ with a tilt angle $(H)$ of the liquid crystal.

In another preferred embodiment of the liquid crystal display device according to the present invention, the pair of substrates each have thereon an alignment film, and the alignment films on the substrates are provided with uniaxial aligning treatment directions which are parallel and identical or opposite to each other.

In still another preferred embodiment of the liquid crystal display device according to the present invention, one of the substrates is provided with a uniaxial aligning treatment direction and also the above-mentioned pretilt-changing characteristic.

According to another aspect of the present invention, there is provided a process for producing a liquid crystal display device as described above, comprising:

a first step of uniaxially alignment-treating the alignment film in a first direction so as to provide an alignment control force which changes monotonously in a second direction perpendicular to the first direction, and a second step of uniaxially alignment-treating the alignment film in a third direction opposite to the first direction so as to provide an alignment control force which changes monotonously in a fourth direction reverse to the second direction.

In a preferred embodiment of the process, the rubbing in the first step and the second step is performed at an intensity ratio in the range of 30:1 to 3:1.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A and 7B are illustrations of a rubbing apparatus used for aligning treatment of a liquid crystal display device according to a first embodiment (Example 1) of the present invention.

FIG. 8 is a graph for illustrating pretilt angle distributions in a plane of liquid crystal display devices according to the first embodiment measured according to the crystal rotation method.

DETAILED DESCRIPTION OF THE INVENTION

Figure 11A:
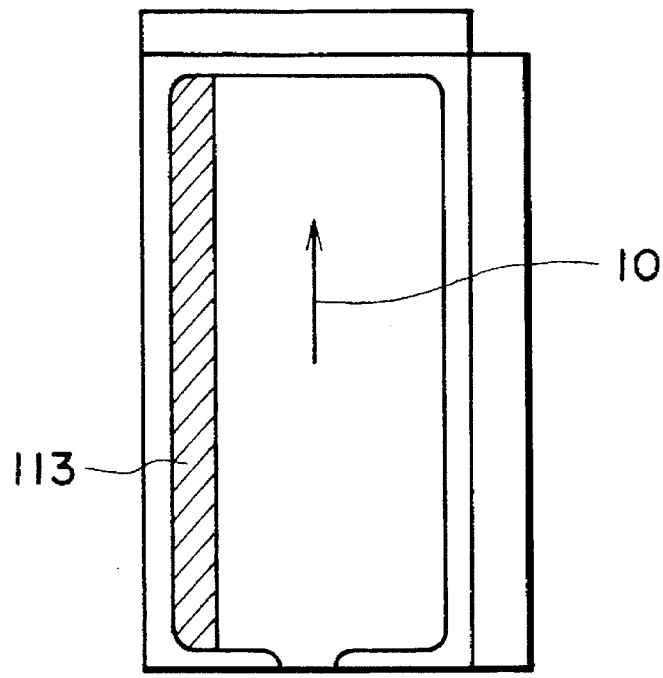
FIGS. 11A and 11B are views for illustrating liquid crystal molecular movement.
Figure 11B:
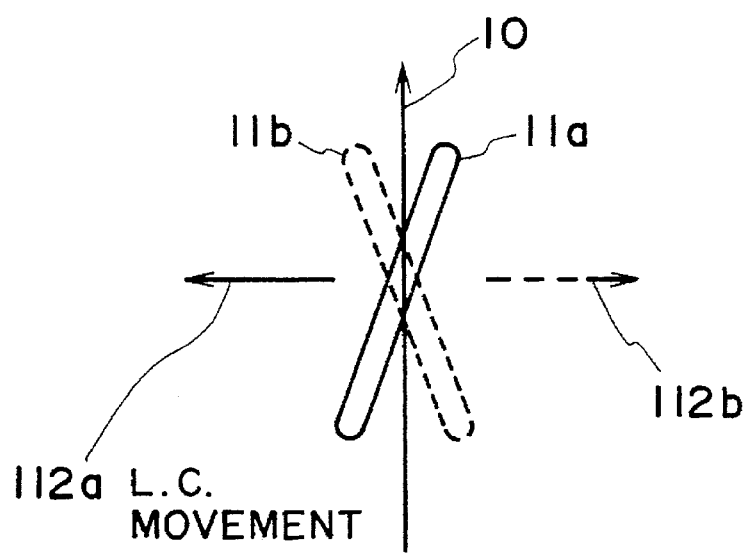
Figure 12A:
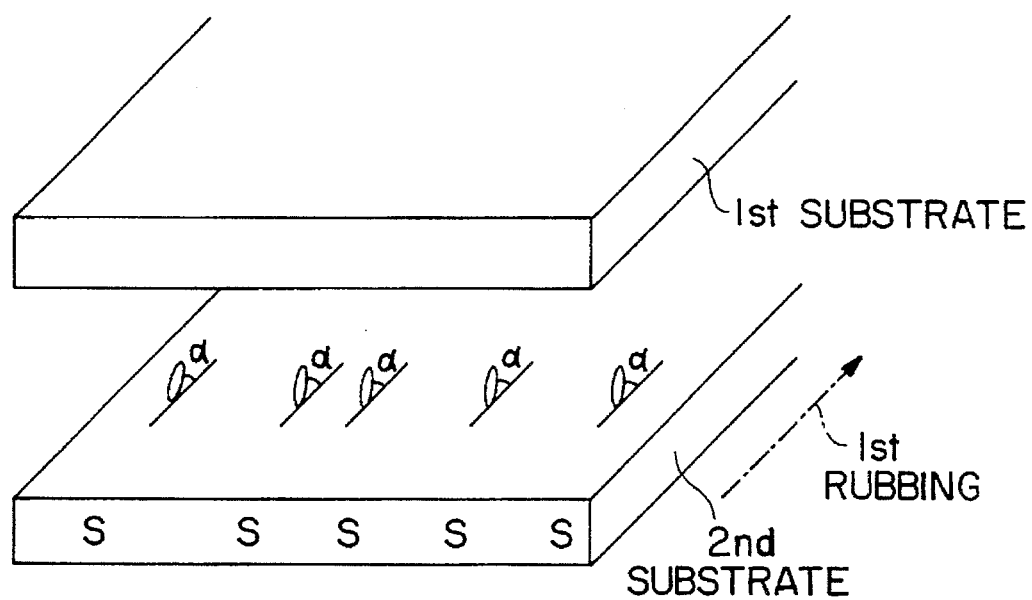
FIG. 12A is an illustration of a pretilt angle distribution after a first rubbing step at an uniform intensity.
Figure 12B:
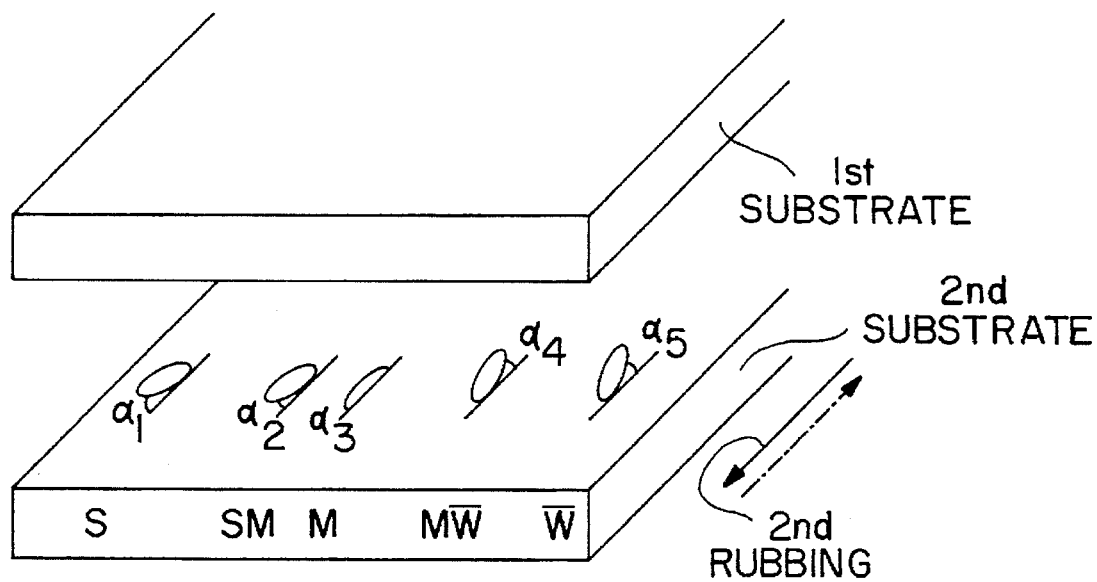
FIG. 12B is an illustration of a resultant pretilt angle distribution after a second rubbing step at intensities that vary along the length of a roller.
Figure 12B:
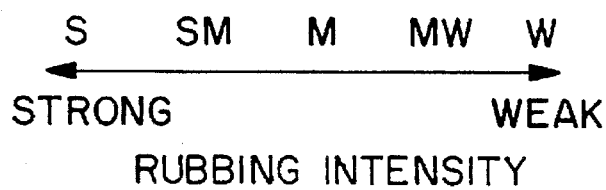
Figure 13:
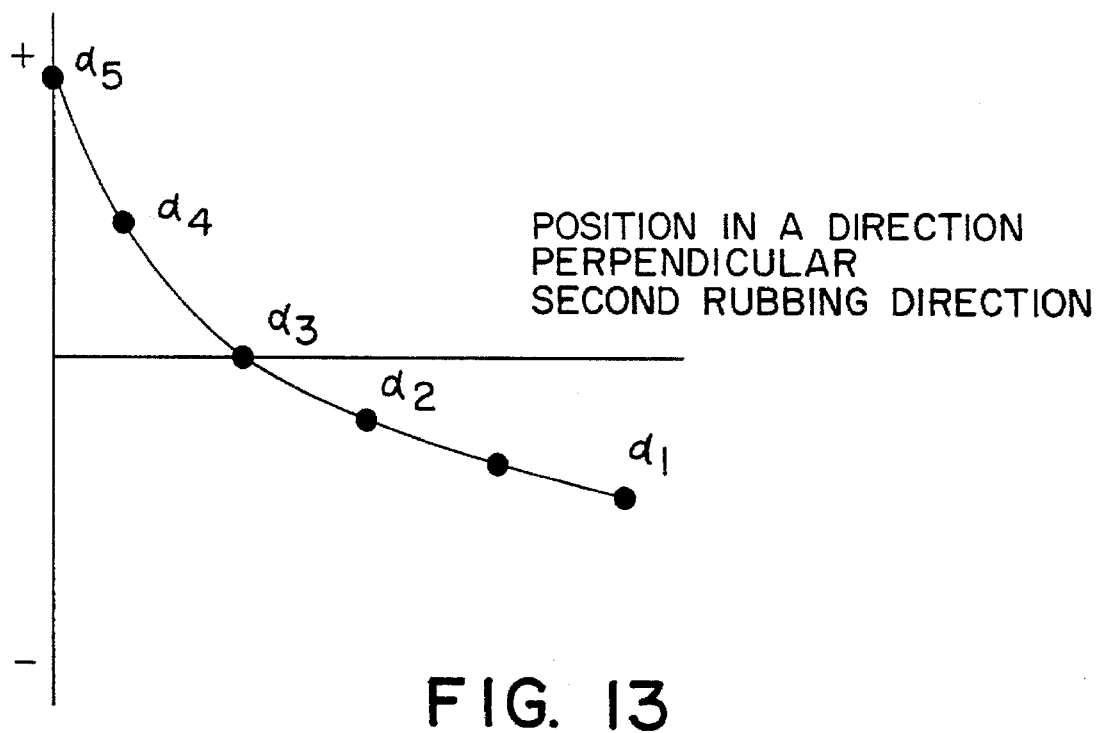
FIG. 13 is a graph illustrating the resultant distribution of pretilt angles after the second rubbing step.

It is presumed that the above-mentioned liquid crystal movement is attributable to an electrodynamic effect caused by perturbation of dipole moments of liquid crystal molecules in an AC electric field given by drive pulses. It is also presumed that the liquid crystal molecular movement direction 112a or 112b is dependent on the average molecular axis direction 11a or 11b in combination with a rubbing direction 10 as shown in FIG. 11B.

As the liquid crystal molecular movement direction depends on the rubbing direction and in view of the fact that the pretilt state of liquid crystal molecules at the substrate boundaries is determined by the rubbing, it is presumed that the liquid crystal molecular movement depends on the pretilt state or the direction of bending of smectic layers which is caused so as to be stable due to an elastic energy change caused by the pretilt.

Further, there has been found a tendency that the direction and rate of the liquid crystal movement are changed depending on the magnitude of a boundary controlling force controlled by the treatment described above, etc. It is considered impossible, however, to completely suppress the liquid crystal movement while retaining good alignment of the liquid crystal by simply weakening the boundary controlling force.

As a result of my study, the above-mentioned liquid crystal molecular movement within a cell, including the direction and amount of movement, is closely related with external factors, such as temperature, intensity and frequency of electric field applied to the liquid crystal device. Further, the liquid crystal molecular movement also depends on internal factors, i.e., factors within the cell, inclusive particularly of a surface pretilt angle $\alpha$ and an alignment state, and also physical properties of the ferroelectric liquid crystal, such as a spontaneous polarization Ps, a tilt angle $\Theta$ and a smectic layer inclination angle $\delta$.

Among the above-mentioned factors, the temperature, electric field and frequency have a trade off relationship with factors such as Ps, thereby affecting the response speed, and are constrained by design factors such as a frame frequency and a duty factor. Accordingly, it has been difficult to control these factors to suppress the liquid crystal molecular movement.

As a result of my study including independent changes of factors among combinations of physical properties of liquid crystal materials and device factors such as a pretilt angle a, it has been found possible to suppress the liquid crystal movement in an entire cell by providing a region where the directionality of the pretilt is canceled at least at a part in a direction in which the liquid crystal movement is caused in the cell.

In the liquid crystal display device according to the present invention, a net liquid crystal movement is removed while realizing a good uniform alignment. More specifically, aligning treatment is applied in at least two directions, normal and reverse, with respect to an alignment film of at least one substrate, thereby canceling the directionality of inclination of boundary molecules with respect to the substrate to some extent to decrease the liquid crystal movement speed at all points in the device, and providing a region wherein the directionality of pretilt is canceled within the device, whereby the liquid crystal movement is effectively suppressed.

Hereinbelow, the present invention will be described with reference to preferred embodiments.

Figure 1:
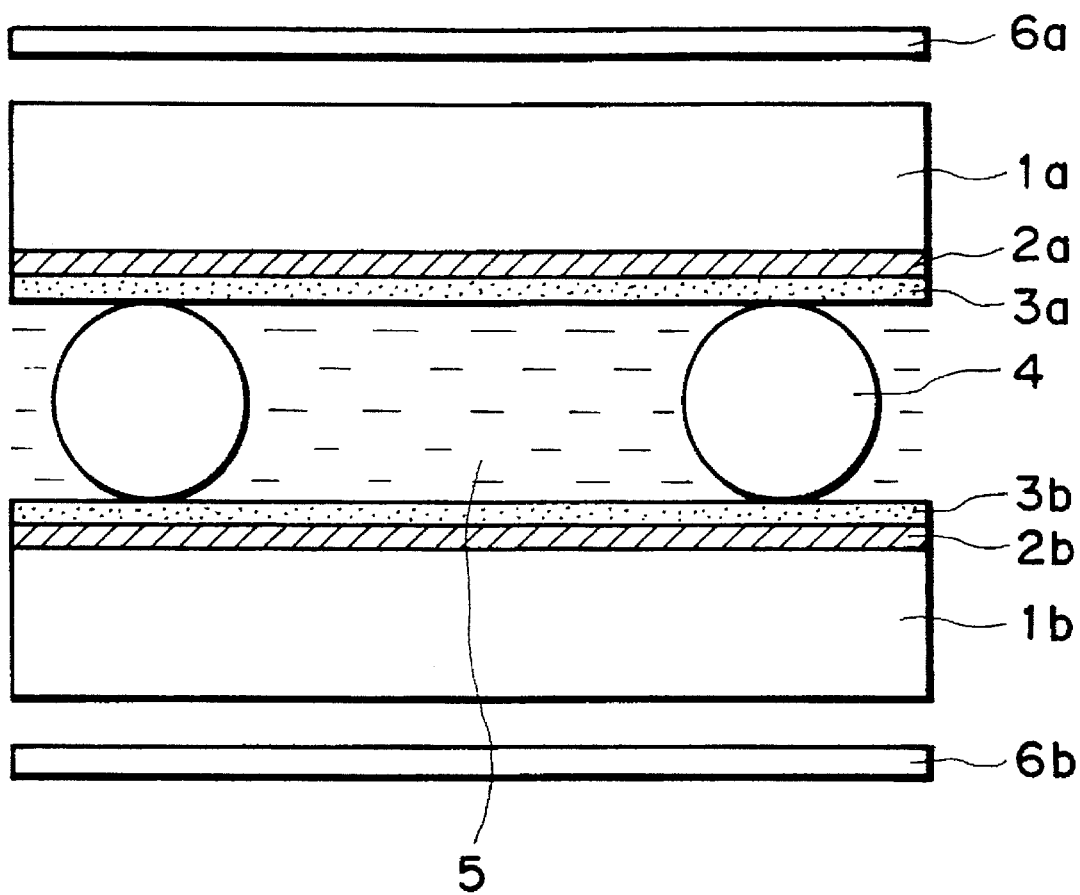
FIG. 1 is a sectional view of a liquid crystal display device according to the present invention.

FIG. 1 is a sectional view of an embodiment of the liquid crystal display device according to the present invention. Referring to FIG. 1, the liquid crystal display device includes a pair of glass substrates 1a and 1b having thereon transparent electrodes 2a and 2b, of tin oxide indium oxide or indium tin oxide (ITO), etc. and alignment films 3a and 3b, each subjected to an aligning treatment. These substrates 1a and 1b are disposed opposite to each other with spacer beads 4 of silica, etc., dispersed therebetween to leave a spacing therebetween which is then filled with a chiral smectic liquid crystal. While not shown in FIG. 1, it is also possible to dispose an insulating film of, e.g., $Ta_2O_5$ or $Ti_xSi_yO_z$, between the transparent electrode 2a (or/and 2b) and the alignment film 3a (or/and 3b) according to necessity.

Figure 2:
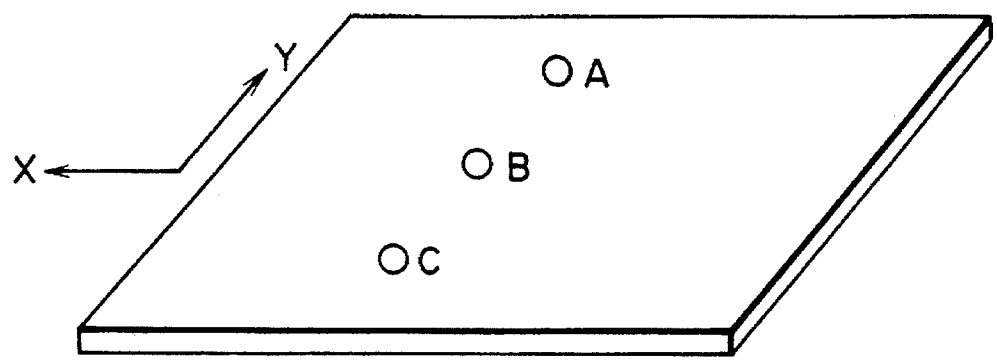
FIG. 2 is a view for illustrating an aligning treatment used in the present invention.
Figure 3:
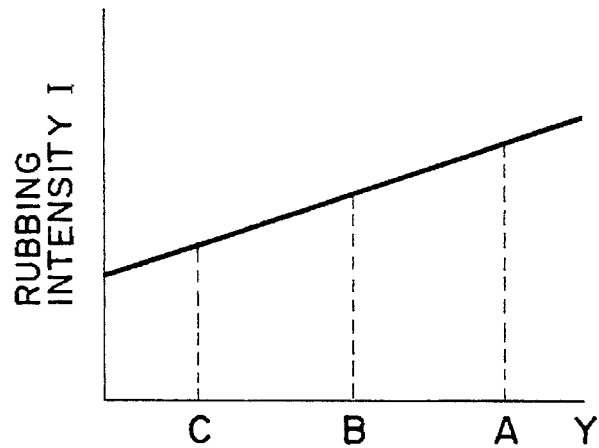
FIG. 3 is a view for illustrating an alignment control force distribution in a plane as a result of a first step aligning treatment according to the present invention.

FIG. 2 is a perspective view of one substrate having a structure as shown in FIG. 1 comprising a glass substrate having thereon transparent electrodes and an alignment film. In a specific embodiment, coordinate axes X and Y are defined, and a first aligning treatment is effected in a positive direction along the X axis so that the resultant alignment control force I increases substantially linearly in a positive direction along the Y axis (i.e., $I_A > I_B > I_C$ wherein $I_A$, $I_B$ and $I_C$ denote alignment control forces at points A, B and C, respectively, in FIG. 2). The alignment control force may be represented by a rubbing intensity R determined by the following equation:

$$R = N \times M(2\pi rn/v - 1),$$

wherein N denotes the number of rubbing operations (times), M denotes the pressing depth of a rubbing cloth (mm), r denotes the rubbing roller radius (mm), n denotes the rotation speed of the rubbing roller (RPM) and v denotes the substrate feed rate (mm/min). In the case of the aligning treatment being rubbing, the intensity I (or R) of the first rubbing has a relationship with the Y-axis coordinate as shown in FIG. 3.

Incidentally, conventional rubbing methods have been disclosed, e.g., in JP-A 64-55527 and JP-A 63-199319.

Figure 4:
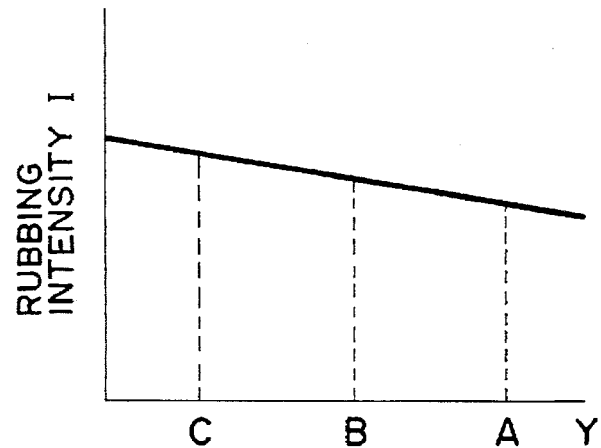
FIG. 4 is a view for illustrating an alignment control force distribution in a plane as a result of a second step aligning treatment according to the present invention.

Then, the same substrate subjected to the first aligning treatment is also subjected to a second aligning treatment in a negative direction along the X axis so as to provide an alignment control force which decreases substantially linearly in a positive direction along the Y axis (i.e., $I_A < I_B < I_C$ in FIG. 2). In the case of the aligning treatment being rubbing, the rubbing intensity I or R in the second rubbing and the Y-axis coordinate have a relationship as shown in FIG. 4.

In order to effect the aligning treatment so as to provide an alignment control force increasing substantially linearly in the positive direction along the Y-axis, it is possible to effect a rubbing treatment while rotating a rubbing roller inclined with respect to a substrate or providing a rubbing cloth wound about a roller with a distribution of rubbing yarn length. These are, however, just examples.

When the first and second aligning treatments are compared, the second aligning treatment has a larger influence on the final resultant alignment state, and accordingly, it is preferred to effect the second aligning treatment in a weaker intensity relative to the first aligning treatment. It is particularly preferred that the first and second aligning treatments are effected at an intensity ratio in the range of 30:1 to 3:1.

In the present invention, it is preferred to use a chiral smectic liquid crystal, preferably one having ferroelectricity, in chiral smectic C phase (SmC*), H phase (SmH*), I phase (SmI*), K phase (SmK*) or G phase (SmG*). For example, it is possible to use a liquid crystal material containing a fluorine-containing mesomorphic compound. Examples of preferred chiral smectic liquid crystals may include those having a biphenyl skeleton or a phenylpyrimidine skeleton and side chains or substituents of halogens, hydrocarbons or fluorocarbons, and other materials. In the present invention, there is provided a large latitude in the selection of particular liquid crystal materials.

Figure 5:
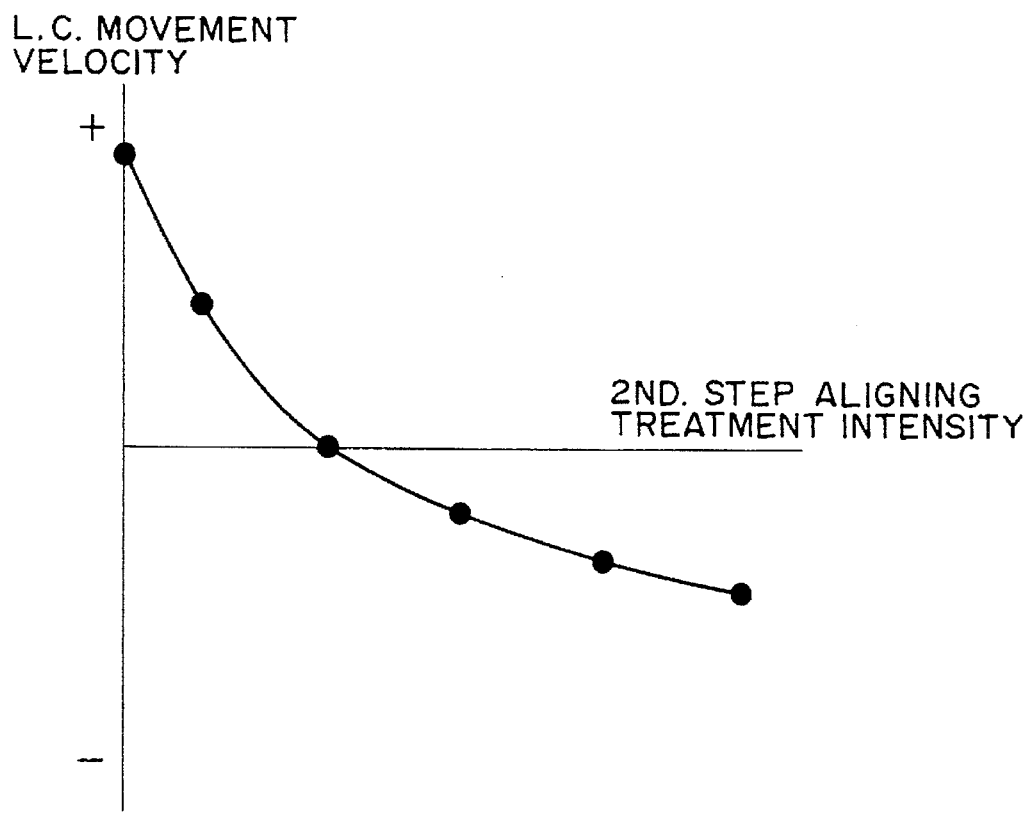
FIG. 5 is a view for illustrating a relationship between a second step aligning treatment intensity and a liquid crystal movement velocity.

In case where the normal and reverse two aligning treatments are effected at equal strengths along the extension of substrate surface ($I_A = I_B = I_C$ in FIG. 2), as different from the present invention, the liquid crystal behavior in the resultant cell varies remarkably depending on the aligning treatment intensity ratio between the first and second aligning treatments. FIG. 5 illustrates a change in liquid crystal movement velocity depending on a second aligning treatment intensity when the first aligning treatment is effected at a constant intensity and the second aligning treatment is effected at varying intensities.

Figures 6A, 6B:
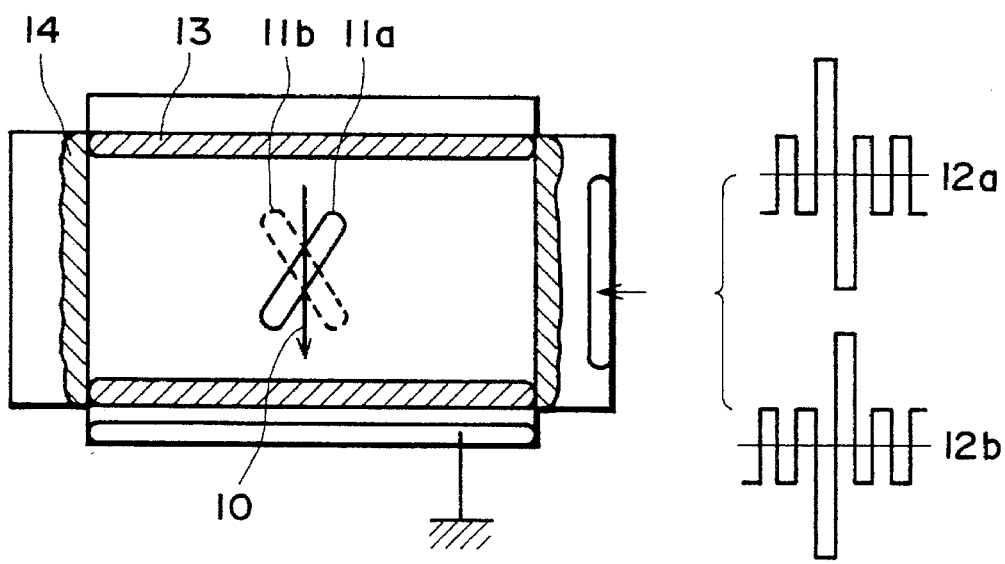
FIG. 6A is a schematic view of a liquid crystal device for illustrating a manner of evaluating a liquid crystal molecular movement and FIG. 6B shows two voltage waveforms used therefor, respectively.

The liquid crystal movement velocity may be measured in a manner as illustrated in FIGS. 6A and 6B, of which FIG. 6A is a schematic plan view of a sample liquid crystal cell and FIG. 6B shows signals applied to the sample cell.

A pair of substrates prepared by a method (according to or not according to the present invention) are applied to each other so that an aligning treatment direction 10 is disposed perpendicular to printed mutually parallel stripe spacers 13, and a gap therebetween is filled with a liquid crystal without sealing on both sides to form a sample cell. Then, silicone oil 14 is dripped on both unsealed sides as a marker or indicator of liquid crystal molecular movement, and a writing waveform 12a or 12b as shown in FIG. 6B is applied to the cell so that the resultant liquid crystal molecular axis is aligned in a direction 11a or 11b as shown in FIG. 6A. When the liquid crystal molecular movement is caused as a result of the drive, the silicone oil is pulled into the cell to indicate the degree of the liquid crystal movement.

In this instance, the liquid crystal movement direction is denoted as positive when the liquid crystal moves leftward (direction (12)) and the liquid crystal molecule is placed in the axial direction 11a in FIG. 11B. As shown in FIG. 5, the liquid crystal molecular movement direction is inverted at a certain aligning treatment condition, which provides a movement velocity of 0 and is determined by a relative intensity between the normal and reverse two aligning treatments.

If the zero velocity condition is satisfied over the entire alignment film surface in a liquid crystal display device, the liquid crystal movement is not caused naturally. As a result of further study on the liquid crystal movement phenomenon, however, it has been found that a net liquid crystal movement is not caused if the zero movement point condition is satisfied in some region in the liquid crystal movement direction (taken as the Y direction in FIG. 2). Accordingly, by effecting normal and reverse two aligning treatments providing mutually opposite distributions of alignment control forces in a liquid crystal movement direction as described above, it is possible to ensure a boundary condition providing a zero movement point in the liquid crystal movement direction, thereby stably preventing the liquid crystal movement. In this case, it is not necessary to establish a strict zero movement point condition so it is unnecessary to provide an additional complicated step.

In order to evaluate the liquid crystal molecular alignment state, the measurement of a pretilt angle α was performed according to the crystal rotation method as described at Jpn. J. Appl. Phys. vol. 19 (1980), No. 10, Short Notes 2013.

More specifically, a sample cell was prepared by applying a pair of substrates to each other so that the inclination of liquid crystal at the boundaries with two substrates were parallel and identical to each other, and the cell was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

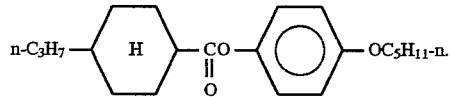

For measurement, the liquid crystal cell was rotated about an axis in parallel with the extension of the pair of substrates and perpendicular to the aligning treatment axis and, during the rotation, the cell was illuminated with a helium-neon laser beam having a polarization plane forming an angle of 45 degrees with respect to the rotation axis and incident from one side of the cell in a direction normal to the rotation axis, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle α, $$\sin 2\alpha = \frac{-2\sin\phi_x}{(n_o + n_e)(1 - (\sin\phi_x/n_o)^2)^{1/2}}$$

wherein $n_o$ denotes the refractive index of ordinary ray, and $n_e$ denotes the refractive index of extraordinary ray.

As a result, it has been clarified that, in liquid crystal display devices according to the present invention, there is formed a region providing an average pretilt angle of 0 degree as measured by the crystal rotation method in the liquid crystal movement direction and, on both sides thereof, the directionalities of average pretilt angles are opposite to each other, that is, the inclinations of liquid crystal molecules with respect to the boundary surface are opposite to each other. As a result, it has been found possible to form a region where the pretilt directionality is canceled to effectively suppress the liquid crystal movement in a device by applying normal and reverse two directions of aligning treatments so as to provide mutually opposite distributions of alignment control forces in the liquid crystal movement direction as described above.

The present invention is particularly effective when applied to a combination of an alignment film and a liquid crystal material providing a relatively small pretilt angle when the combination is subjected to an ordinary unidirectional aligning treatment, preferably a pretilt angle of at most about 5 degrees, more preferably at most about 3 degrees, in order to provide a device with a good alignment and a high contrast.

Hereinbelow, the present invention will be described based on Examples.

EXAMPLE 1

FIGS. 7A and 7B illustrate a rubbing apparatus used for aligning treatment of alignment films of a liquid crystal display device prepared in this Example 1.

Referring to FIGS. 7A and 7B, a rubbing roller 71 had a diameter of 85 mm and, about the surface thereof, a nylon cloth 72 was applied. On a stage 73 was disposed a substrate 74 comprising a glass substrate coated with ITO transparent electrodes and a polyimide alignment film as described above. More specifically, the glass substrate measured 200 mm×300 mm and had a thickness of 1.1 mm. The ITO electrodes had a thickness of 900 ∅. The polyimide alignment film was disposed in various thicknesses in the range of 10–500 Å.

Each substrate 74 was fixed on a stage 73 which was moved in a positive direction along an X-axis relative to the rubbing roller 71 rotating in the arrow direction so as to rub the alignment film on the substrate 73. The pressing strength (depth) of the rubbing cloth 72 relative to the substrate 74 was adjusted by a vertical movement of the stage 73, and the stage 73 could be inclined by a desired small angle.

By using the apparatus, rubbing was performed in normal and reverse two directions. As a sequence, a substrate 74 was fixed onto a stage inclined at a desired angle, and the stage was moved in the positive X direction to effect a first rubbing, after which the substrate 74 was turned at 180 degrees and then the stage 73 was moved similarly in the positive X direction to effect a second rubbing. The rubbing intensity in the second rubbing was principally controlled by changing the rotational speed of the rubbing roller, although it could be also controlled by changing the substrate pressing depth or the stage moving speed. The inclination angle of the stage 73 with respect to the rubbing roller may be the same or different in the first and second rubbings.

As a result of such normal and reverse two directions of rubbing, a region subjected to a strong rubbing due to a large pressing depth in the first rubbing is subjected to a weak rubbing due to a small pressing depth in the second rubbing, thus being largely affected by the first rubbing. On the other hand, a region subjected to a weak rubbing due to a small pressing depth in the first rubbing is subjected to a strong rubbing due to a large pressing depth in the second rubbing, thus being largely affected by the second rubbing. Accordingly, each substrate is provided with a region where the effects of rubbing in the two directions are canceled with each other somewhere in the Y direction.

In this Example, substrates having alignment films in five thicknesses of 10 Å, 50 Å, 100 Å, 200 Å, and 500 Å were rubbing-treated in the above-described manner respectively under conditions as shown in the following Table 1 wherein $Y_1$ and $Y_2$ denote coordinate positions along the Y-axis of each substrate 74 shown in FIG. 7.

TABLE 1

|  | Rubbing | |
|---|---|---|
|  | First | Second |
| Pressing depth at $Y_1$ [mm] | 0.5 | 0.5 |
| Pressing depth at $Y_2$ [mm] | 0.11 | 0.1 |
| Roller rotational speed [rpm] | 1000 | 100 |
| Stage speed [mm/sec] | 50 | 50 |
| Rubbing (repetition) [time] | 1 | 1 |

Sample cells were prepared by using the substrates treated in the above-described manner. The prepared cells were roughly divided into three types: including parallel cells each having a pair of substrates, of which the rubbing directions were disposed in substantially parallel and in identical directions; anti-parallel cells each having a pair of substrates of which the rubbing directions were disposed in substantially parallel and opposite directions; and third-type cells each having a pair of substrates including one provided with an alignment film and subjected to the above-mentioned normal and reverse two directions of aligning treatment and the other with no alignment film but subjected to a homeotropic aligning treatment by application of a silane coupling agent.

Each sample cell was constituted as described with reference to FIGS. 6A and 6B so that the rubbing direction 10 was disposed perpendicular to the sealing members 13 applied in parallel, and was filled with a liquid crystal.

The liquid crystal used was a mixture liquid crystal A showing a phase transition series of Crystal →SmC*→SmA→Iso, an SmC* phase at 30° C., a tilt angle Ⓗ of above 25 degrees and a spontaneous polarization of 20 µC/cm².

After the liquid crystal injection, each cell was cooled to room temperature to be observed with respect to the alignment state in the SmC* phase, whereby all the cells showed a good uniform alignment state with little alignment defect and also showed a large apparent tilt angle θa of 21 degrees.

Then, as shown in FIG. 6A, silicone oil 14 was dripped on both unsealed sides of each cell as a marker or indicator of liquid crystal molecular movement, and a writing waveform 12a or 12b as shown in FIG. 6B was applied to the cell so that the resultant liquid crystal molecular axis was aligned in a direction 11a or 11b as shown in FIG. 6A. When the liquid crystal molecular movement was caused as a result of the drive, the silicone oil was pulled into the cell to indicate the degree of the liquid crystal movement. The rate of liquid crystal molecular movement was evaluated by the distance of the marker introduced into the cell.

As a result, with respect to all the 15 types of devices prepared, remarkable liquid crystal movement was not recognized except that some invasion of the silicone oil 14 due to exudation was observed. Thus, it was confirmed that the liquid crystal movement could be stably prevented by the present invention even if there was some change in cell parameters, such as unsymmetry of the kind and thickness of the alignment films. Further, the liquid crystal movement was not recognized even when external factors, such as temperature and drive conditions, were changed.

One sample each of anti-parallel cells in alignment film thicknesses of 20 Å, 50 Å and 100 Å, respectively, in addition to the samples for measurement of liquid crystal movement velocity was prepared and filled with the above-mentioned liquid crystal mixture for pretilt angle measurement, to measure the pretilt angle change in a direction perpendicular to the rubbing direction (i.e., in the Y-direction shown in FIG. 2) by the crystal rotation method. The results are shown in FIG. 8. The Y-coordinate axis positions were taken positive in accordance with the Y-axis shown in FIG. 8, and the value was taken as 0 at an edge of each sample cell closer to the original. As is understood from the results shown in FIG. 8, each cell showed a region providing an average pretilt angle of substantially zero degree and, on both sides thereof, average pretilt directions were opposite to each other. Accordingly, it was presumed that the liquid crystal movement was suppressed because there was formed a region where the directionality of pretilt angle was canceled in the direction of liquid crystal movement in the device.

EXAMPLE 2

Figure 9A:
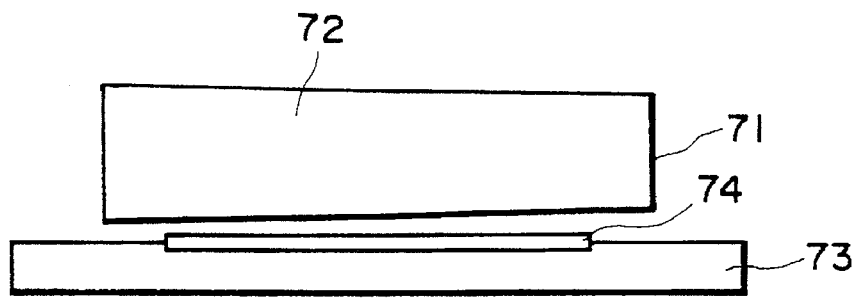
FIGS. 9A and 9B are illustrations of a rubbing apparatus used for aligning treatment of a liquid crystal display device according to a second embodiment (Example 2) of the present invention.
Figure 9B:
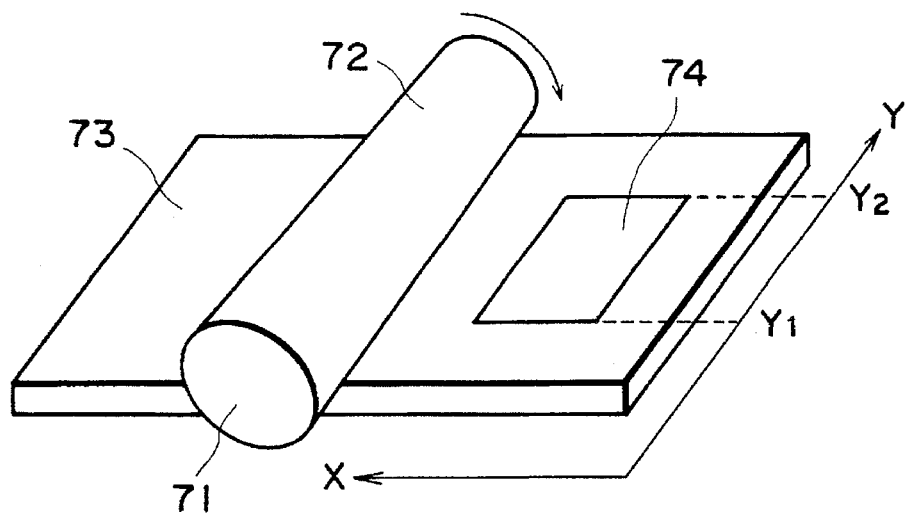

FIGS. 9A and 9B illustrate a rubbing apparatus used for aligning treatment of alignment films of a liquid crystal display device prepared in this Example 2.

As shown in FIGS. 9A and 9B, the rubbing roller 71 used in this Example had different diameters at both ends and could provide a rubbing intensity changing substantially linearly in a Y-direction shown in FIG. 9B without inclining the stage 73. Also in this Example 2 rubbing was performed in normal and reverse two directions in a similar manner as in Example 1. That is, the stage 73 was moved in the positive X direction to effect a first rubbing. Then, the substrate 74 was turned at 180 degrees and then the stage 73 was moved similarly in the positive X direction to effect a second rubbing. Also in this case, the rubbing intensity in the second rubbing was principally controlled by changing the rotational speed of the rubbing roller, although it could be also controlled by changing the substrate pressing depth or the stage moving speed.

Also in this Example, similarly as in Example 1, substrates having alignment films in five thicknesses of 10 Å, 50 Å, 100 Å, 200 Å, and 500 Å were rubbing treated in the above-described manner respectively under conditions as shown in the following Table 2.

As shown in FIG. 9A, the rubbing roller had a shape of truncated cone (having diameters of 85 mm at one end and 85.5 mm at the other end before application of a rubbing cloth) and coated with a nylon cloth applied thereabout. In this case, when the pressing depth was determined on one end, the pressing depth on the other end was automatically determined based on the difference in diameter at both ends.

TABLE 2

|  | Rubbing | |
| --- | --- | --- |
|  | First | Second |
| Pressing depth at $Y_1$ [mm] | 0.6 | 0.6 |
| (Pressing depth at $Y_2$ [mm]) | (0.1) | (0.1) |
| Roller rotational speed [rpm] | 800 | 80 |
| Stage speed [mm/sec] | 50 | 50 |
| Rubbing (repetition) [time] | 1 | 1 |

Sample cells were prepared by using the substrates treated in the above-described manner otherwise similarly as in Example 1, including 15 types roughly classified into three major types of parallel cells, anti-parallel cells, and asymmetrical cells having one substrate rubbed and the other substrate treated for homeotropic alignment. Each blank cell thus prepared was filled with the same mixture crystal A to form a liquid crystal display device. All the cells thus prepared showed a good uniform alignment state with little alignment defect and also showed a large apparent tilt angle $\theta a$ of 21.5 degrees.

Each cell was subject to measurement of liquid crystal movement speed similarly as in Example 1.

As a result, with respect to all the 15 types of devices prepared, remarkable liquid crystal movement was not recognized except that some invasion of the silicone oil 14 due to exudation was observed. Thus, similar results as in Example 1 were obtained, and it was confirmed that the liquid crystal movement could be stably prevented by the present invention even if there was some change in cell parameters, such as unsymmetry of the kind and thickness of the alignment films. Further, the liquid crystal movement was not recognized even when external factors, such as temperature and drive conditions, were changed.

Similarly as in Example 1, the pretilt angle distribution measurement was performed with respect to the devices in this Example. As a result, each cell showed a region providing an average pretilt angle of substantially zero degree and, on both sides thereof, average pretilt directions were opposite to each other.

EXAMPLE 3

Figure 10:
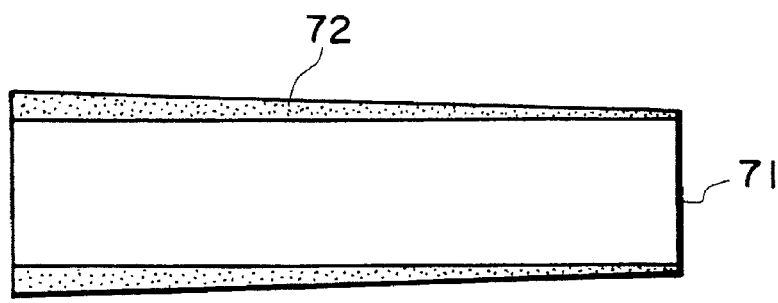
FIG. 10 is a sectional view of a rubbing roller of a rubbing apparatus used in a third embodiment (Example 3) according to the present invention.

FIG. 10 is a sectional view of a rubbing roller used for aligning treatment of alignment films of a liquid crystal display device prepared in this Example 3.

As shown in FIG. 10, the rubbing roller 71 used in this Example was coated with a rubbing cloth 72 on which yarn was planted in a length increasing substantially linearly from one end to the other end. By using the rubbing roller, it was possible to provide a rubbing intensity distribution without inclining the stage. The rubbing cloth used had yarn lengths of 8 mm at the left end and 5 mm at the right end, respectively referring to FIG. 10. The roller diameter was 85 mm.

Also in this Example, similarly as in Examples 1 and 2, substrates having alignment films in five thicknesses of 10 Å, 50 Å, 100 Å, 200 Å, and 500 Å were rubbing-treated in the above-described manner respectively under conditions as shown in the following Table 3.

In this case, similarly as in Example 2, when the pressing depth was determined on one end, the pressing depth on the other end was automatically determined based on the difference in yarn length at both ends.

TABLE 3

|  | Rubbing | |
| --- | --- | --- |
|  | First | Second |
| Pressing depth at $Y_1$ [mm] | 3.3 | 3.3 |
| (Pressing depth at $Y_2$ [mm]) | (0.3) | (0.3) |
| Roller rotational speed [rpm] | 250 | 25 |
| Stage speed [mm/sec] | 100 | 100 |
| Rubbing (repetition) [time] | 1 | 1 |

Sample cells were prepared by using the substrates treated in the above-described manner otherwise similarly as in Example 1, including 15 types roughly classified into three major types of parallel cells, anti-parallel cells, and asymmetrical cells having one substrate rubbed and the other substrate treated for homeotropic alignment. Each blank cell thus prepared was filled with the same mixture crystal A to form a liquid crystal display device. All the cells thus prepared showed a good uniform alignment state with little alignment defect and also showed a large apparent tilt angle θa of 21.3 degrees.

Each cell was subjected to measurement of liquid crystal movement speed similarly as in Example 1.

As a result, with respect to all the 15 types of devices prepared, remarkable liquid crystal movement was not recognized except that some invasion of the silicone oil 14 due to exudation was observed. Thus, similar results as in Example 1 were obtained, and it was confirmed that the liquid crystal movement could be stably prevented by the present invention even if there was some change in cell parameters, such as unsymmetry of the kind and thickness of the alignment films. Further, the liquid crystal movement was not recognized even when external factors, such as temperature and drive conditions, were changed.

Similarly as in Example 1, the pretilt angle distribution measurement was performed with respect to the devices in this Example. As a result, each cell showed a region providing an average pretilt angle of substantially zero degree and, on both sides thereof, average pretilt directions were opposite to each other.

As has been described above, the liquid crystal display device according to the present invention is provided therein with a region where the pretilt angle is substantially zero and, on both sides thereof, the pretilt directionalities are opposite to each other, such that the liquid crystal molecular movement during drive can be effectively suppressed without impairing good alignment characteristic. As a result, the liquid crystal display device is free from a change in liquid crystal layer thickness leading to coloring or deterioration of appearance and is provided with good switching characteristics. Thus, the liquid crystal display device is provided with high durability capable of stably displaying high-quality images.

What is claimed is:

1. A liquid crystal display device, comprising: a pair of substrates each having thereon an electrode and a chiral smectic liquid crystal disposed between said substrates so that said liquid crystal assumes at least two optically stable states; at least one of the substrates having thereon an alignment film, said alignment film having a uniaxial aligning treatment direction and also a pretilt-changing characteristic such that it provides a pretilt angle which monotonously changes and is then inverted through 0 degree to a state providing a reverse molecular inclination with respect to said at least one substrate.

2. A device according to claim 1, wherein said liquid crystal provides an apparent tilt angle θa defined as a half of an angle between said two optically stable states satisfying a relationship of $(H)/2 < θa \leq (H)$ with a tilt angle $(H)$ of the liquid crystal.

3. A device according to claim 1, wherein said pair of substrates each have thereon an alignment film, and said alignment films on the substrates are provided with uniaxial aligning treatment directions which are parallel and identical to each other.

4. A device according to claim 1, wherein said pair of substrates each have thereon an alignment film, and said alignment films on the substrates are provided with uniaxial aligning treatment directions which are parallel and opposite to each other.

5. A device according to claim 1, wherein said pair of substrates each have thereon an alignment film, and one of said substrates has been subjected to a homeotropic aligning treatment.

6. A process for producing a liquid crystal display device including a pair of substrates each having thereon an electrode and a chiral smectic liquid crystal disposed between the substrates so that the liquid crystal assumes at least two optically stable states, at least one of the substrates having thereon an alignment film; said process comprising:

a first step of uniaxially alignment-treating the alignment film in a first direction so as to provide an alignment control force which changes monotonously in a second direction perpendicular to the first direction, and a second step of uniaxially alignment-treating the alignment film in a third direction opposite to the first direction so as to provide an alignment control force which changes monotonously in a fourth direction reverse to the second direction, such that the alignment film has a pretilt-changing characteristic, and such that it provides a pretilt angle which monotonously changes and is then inverted through 0 degree to a state providing a reverse molecular inclination with respect to the at least one substrate.

7. A process according to claim 6, wherein said uniaxially alignment-treating steps are performed by rubbing.

8. A process according to claim 7, wherein the rubbing in said first step and said second step is performed at an intensity ratio in the range of 30:1 to 3:1.

9. A process for producing a liquid crystal display device including a pair of substrates each having thereon an electrode and a chiral smectic liquid crystal disposed between the substrates so that the liquid crystal assumes at least two optically stable states, at least one of the substrates having thereon an alignment film; said process comprising:

a first step of rubbing the alignment film in a first direction, and a second step of rubbing the alignment film in a second direction opposite to the first direction so as to provide a rubbing intensity which changes monotonously in a third direction perpendicular to the second direction, and such that the alignment film has a pretilt angle distribution including a region having a pretilt angle 0 and a plurality of corresponding regions on opposite sides of the pretilt angle 0 region, the corresponding regions having opposite pretilt angle directions.

10. A process according to claim 9, wherein the rubbing in said second step is performed by using a rubbing roller extending in the third direction and inclined with respect to the at least one substrate.

11. A process according to claim 9, wherein the rubbing in said second step is performed by using a rubbing roller having a rubbing cloth yarn length which varies along a roller length extending in the third direction.

* * * * *

UNITED STATES PATENT AND TRADEMARK OFFICE
CERTIFICATE OF CORRECTION

PATENT NO. : 5,668,615

DATED : September 16, 1997

INVENTOR(S) : HIROKATSU MIYATA

Page 1 of 3

It is certified that error appears in the above-identified patent and that said Letters Patent is hereby corrected as shown below:

TITLE PAGE:
AT [56] REFERENCES CITED

U.S. PATENT DOCUMENTS

"Brossig et al." should read --Brosig et al.--.

FOREIGN PATENT DOCUMENTS

"01055527 3/1989 Japan" should read
--64-55527 3/1989 Japan--; and

"63-30828 2/1988 Japan" should read
--3-30828 2/1991 Japan--.

COLUMN 1

Line 9, "processor and" should read --processor,--; and
Line 25, "on" should read --or--.

COLUMN 2

Line 8, "With" should read --with--.

COLUMN 3

Line 20, "an" should read --a--.

COLUMN 4

Line 7, "angle a," should read --angle $\alpha$,--; and
Line 31, "tin oxide" should read --tin oxide,--.

UNITED STATES PATENT AND TRADEMARK OFFICE
CERTIFICATE OF CORRECTION

PATENT NO. : 5,668,615

DATED : September 16, 1997

INVENTOR(S) : HIROKATSU MIYATA

Page 2 of 3

It is certified that error appears in the above-identified patent and that said Letters Patent is hereby corrected as shown below:

COLUMN 5

Line 30, "skeleton" (second occurrence) should read --skeleton,--; and

Line 66, "(12)" should read --(112a)--.

COLUMN 6

Line 24, "at" should read --in--.

COLUMN 7

Line 32, "900 ø" should read --900 Å--.

COLUMN 8

Line 13, "0.11" should read --0.1--.

COLUMN 9

Line 15, "degree" should read --degrees--; and
Line 46, "of" should read --of a--.

COLUMN 10

Line 26, "degree" should read --degrees--.

UNITED STATES PATENT AND TRADEMARK OFFICE
CERTIFICATE OF CORRECTION

PATENT NO. : 5,668,615
DATED : September 16, 1997
INVENTOR(S) : HIROKATSU MIYATA Page 3 of 3

It is certified that error appears in the above-identified patent and that said Letters Patent is hereby corrected as shown below:

COLUMN 11

Line 24, "degree" should read --degrees--; and
Line 33, "characteristic." should read
--characteristics.--.

Signed and Sealed this

Seventeenth Day of March, 1998

Attest:

BRUCE LEHMAN

Attesting Officer

Commissioner of Patents and Trademarks